W. J. BOLL.
DEVICE FOR SHELLING THE ENDS OF SEED CORN EARS.
APPLICATION FILED MAY 20, 1914.
1,121,460.
Patented Dec. 15, 1914.
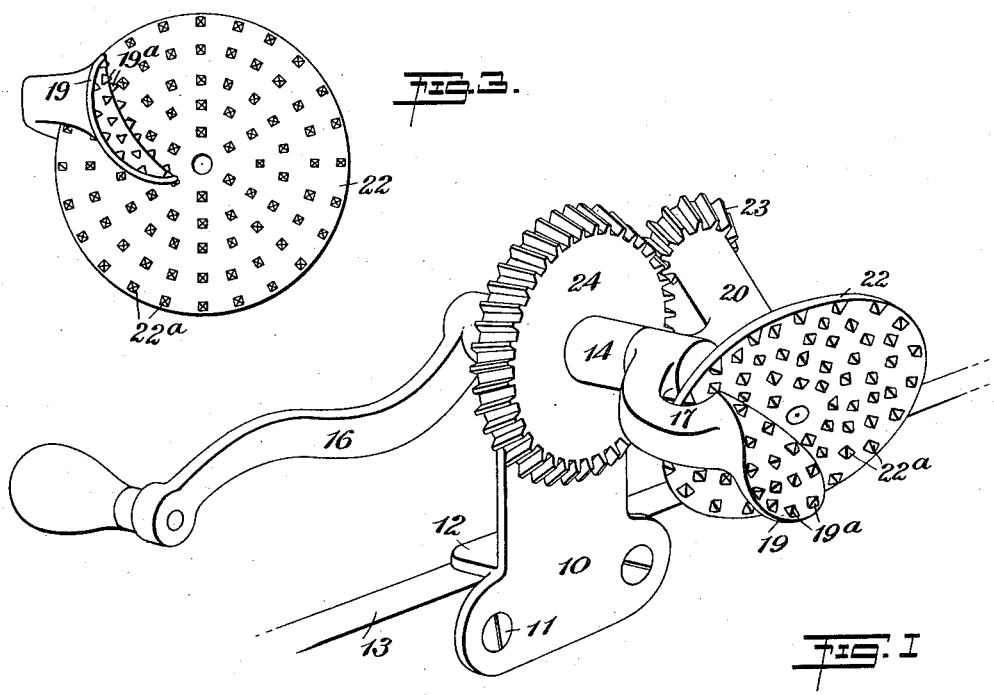
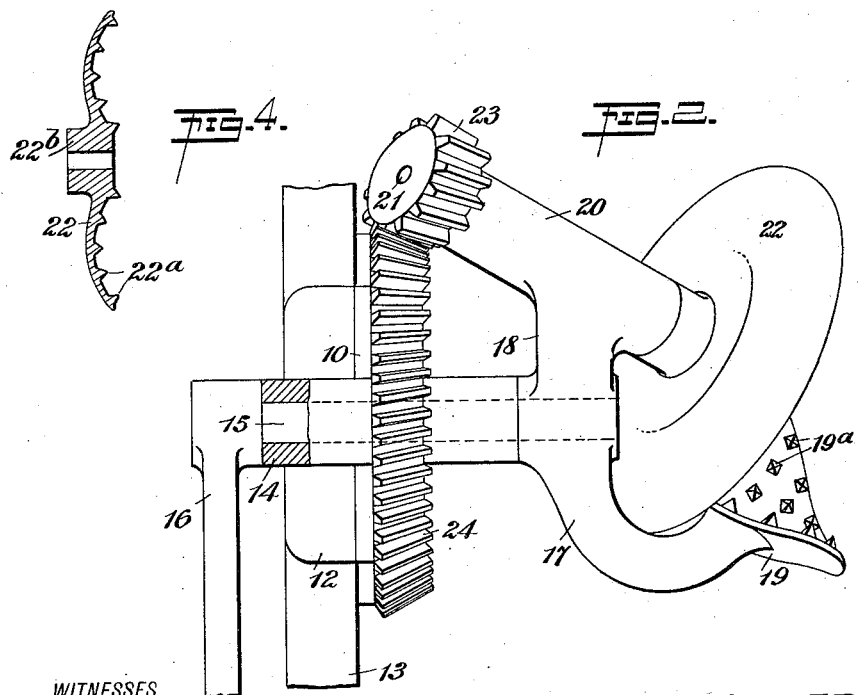
WITNESSES
INVENTOR
William J. Boll
BY
ATTORNEYS

UNITED STATES PATENT OFFICE.

WILLIAM J. BOLL, OF PLATTEVILLE, WISCONSIN.

DEVICE FOR SHELLING THE ENDS OF SEED-CORN EARS.

1,121,460. Specification of Letters Patent. Patented Dec. 15, 1914.

Application filed May 20, 1914. Serial No. 839,782.

*To all whom it may concern:*

Be it known that I, WILLIAM J. BOLL, a citizen of the United States, and a resident of Platteville, in the county of Grant and State of Wisconsin, have invented a new and Improved Device for Shelling the Ends of Seed-Corn Ears, of which the following is a full, clear, and exact description.

My invention relates to a means for shelling from a seed corn ear the kernels at and adjacent to the tip and butt, said kernels being useless for seed.

Objects of my invention are to insure the complete removal of the kernels at and adjacent to the tip and butt; to perform the shelling operation expeditiously and with convenience to the operator, and to embody the invention in a strong and simple construction involving the minimum number of operative elements.

The invention will be particularly explained in the specific description following.

Reference is to be had to the accompanying drawings forming a part of this specification, in which similar characters of reference indicate corresponding parts in all the views.

Figure 1 is a perspective view of the device for the indicated purpose embodying my invention; Fig. 2 is a plan view with parts in section and others broken away; Fig. 3 is a front view of the shelling elements; and Fig. 4 is a detail view indicating the cross sectional form of one of the said shelling elements.

In constructing the device for the purpose, a frame or body is provided to carry the operative parts, said frame being desirably in the form of a standard 10 adapted to be secured at its lower end by screws 11 or the like to any suitable support 13, there being a rear flange 12, perpendicular to the standard adapted to rest on the top of said support. The standard is formed with a bearing 14 for a shaft 15 which may be driven in any suitable manner, there being shown for the purpose a crank handle 16 on said shaft.

The shaft serves to actuate relatively movable shelling elements. Thus on the forward end of the shaft arm 17, 18, are mounted to turn with the shaft advantageously disposed approximately at diametrically opposite sides. The one arm 17 carries a shelling element 19, adapted to shell the sides of the ear of corn near the tip and butt; the other arm 18 provides a bearing 20 for a shaft 21 carrying a shelling disk 22 for the corn at either extreme end of the ear. Shelling teeth $19^a$, $22^a$ are produced on the shelling elements 19, 22. The element 19 is curved and the disk 22 is advantageously given a form to produce an annular concave depression, as will be seen best in Fig. 4. Since the two elements are carried by fixed arms on the shaft 15, the said elements will be caused to revolve bodily about the said shaft as an axis, and means is provided for causing the disk 22 to turn on its own axis in addition. The bearing 20 and hence the shaft 21 carrying the disk 22, is obliquely disposed with respect to the shaft 15, and at a side of the latter, so that the axes do not converge toward each other.

The shelling element 19 is inclined to a line constituting an extension of the axis of the shaft 15, and the lower end of the said element 19 is sufficiently distant from the said line so that when an ear of corn is positioned with an end against the element 19, the ear will be disposed with its axis in a line intersecting the axis of the shaft 15. The curvature of the element 19 is approximately that of the curvature of an ear of corn. Thus the said curved element in revolving about the axis of the shaft 15 will be caused to revolve around the ear, and there will be no tendency to move the ear bodily, so that the operator in placing the ear in position will be required only to sustain the ear against the shelling force of the shelling elements 19, 22.

The angular position of the disk 22 and the diameter of the disk are such that said disk in turning about the axis of the shaft 15 will at all times lie in and be rotated on its own axis in a plane cutting a line coaxial with the shaft 15. Hence the element 19 is disposed in front of the disk at one side of the center of the latter, the disk extending into the space between the inner end of the element 19 and the outer end of the shaft 15. The arrangement disposes both of the shelling elements approximately perpendicular to each other and each obliquely to the axis of revolution.

In order to turn in a simple and effective manner, the disk 22 on its own axis while revolving the said disk and its co-acting shelling element 19 about the shaft 15 as an axis, I provide bevel skew-gear elements conforming to the angular position of the oblique shaft 21 relatively to the shaft 15. These elements consist of a pinion 23 fixed on a shaft 21 at the end opposite to the disk 22, said pinion being in mesh with a fixed gear 24, the inclination of the teeth in the said pinion and gear permitting the obliquely disposed pinion to roll around the fixed gear.

It will be seen that the relation of the two shelling elements 19, 22, to each other and to the axis of the shaft 15, is such that the said shelling elements determine the position of the ear of corn relatively to the axis of revolution, since the ear in practice, will be placed so as to bear laterally against the element 19, with the extreme end pressed forwardly against the disk 22, in doing which the extreme end of an ear of corn will be approximately centered with the axis of revolution, the ear inclining to said axis.

Having thus described my invention, I claim as new, and desire to secure by Letters Patent:

1. In a device of the character described, a shelling element to shell the extreme end of an ear of corn, a shelling element of shell side portions of the ear adjacent to the end, means for revolving the two elements about a fixed axis, and means for rotating the first-mentioned shelling element on its own axis.

2. In a device of the character described, a shelling element, and means for revolving the said element bodily about a fixed axis, said element being inclined to its axis of revolution and held against turning on its own axis, said element having shelling means on its forward face.

3. In a device of the character described, a shelling element held against rotation on its own axis, and means for revolving the said element bodily about a fixed axis, the said element presenting a concave face provided with means for shelling corn, and being inclined to its axis of revolution.

4. A device of the character described, comprising shelling elements disposed in intersecting planes approximately perpendicular to each other, means for revolving both elements about a fixed axis, and means for turning one of the elements on its own axis, the respective planes of the elements being oblique to the said axis of revolution.

5. A device of the character described comprising a shelling disk, a second shelling element in front of the first element and approximately perpendicular thereto, means for revolving both elements bodily about a fixed axis, and means for turning the disk on an axis oblique to the axis of revolution of the elements.

6. A device of the character described comprising a shelling disk, a second shelling element in front of the first element and approximately perpendicular thereto, means for revolving both elements bodily about a fixed axis, and means for turning the disk on an axis oblique to the axis of revolution of the elements, the said disk having an annular depression in the face thereof, and the second shelling element being curved to conform generally to the curvature of an ear of corn.

In testimony whereof I have signed my name to this specification in the presence of two subscribing witnesses.

WILLIAM J. BOLL.

Witnesses:
TRELLA HOLCOMB,
M. S. BLOCK.

Copies of this patent may be obtained for five cents each, by addressing the "Commissioner of Patents, Washington, D. C."

It is hereby certified that in Letters Patent No. 1,121,460, granted December 15, 1914, upon the application of William J. Boll, of Platteville, Wisconsin, for an improvement in "Devices for Shelling the ends of Seed-Corn Ears," an error appears in the printed specification requiring correction as follows: Page 2, line 28, second occurrence, for the word "of" read *to;* and that the said Letters Patent should be read with this correction therein that the same may conform to the record of the case in the Patent Office.

Signed and sealed this 26th day of January, A. D., 1915.

[SEAL.]

R. F. WHITEHEAD,
*Acting Commissioner of Patents.*